(12) United States Patent
Zhang et al.

(10) Patent No.: US 10,495,000 B2
(45) Date of Patent: Dec. 3, 2019

(54) CONTOURED EVAPORATIVE COOLING MEDIUM

(71) Applicant: General Electric Company, Schenectady, NY (US)

(72) Inventors: Hua Zhang, Greer, SC (US); Naveen Ghattadhahalli Parmeshwar, Greenville, SC (US); Christopher Conrad Frese, Greenville, SC (US); Valery Ivanovich Ponyavin, Greenville, SC (US); Bradly Aaron Kippel, Greer, SC (US)

(73) Assignee: General Electric Company, Schenectady, NY (US)

( * ) Notice: Subject to any disclaimer, the term of this patent is extended or adjusted under 35 U.S.C. 154(b) by 368 days.

(21) Appl. No.: 15/463,680

(22) Filed: Mar. 20, 2017

(65) Prior Publication Data
US 2018/0266322 A1    Sep. 20, 2018

(51) Int. Cl.
| | |
|---|---|
| *F02C 7/143* | (2006.01) |
| *F28C 3/08* | (2006.01) |
| *F28F 3/02* | (2006.01) |
| *F28F 3/12* | (2006.01) |
| *F28F 21/06* | (2006.01) |
| *F02C 7/04* | (2006.01) |
| *F02C 7/05* | (2006.01) |
| *F28C 1/16* | (2006.01) |

(52) U.S. Cl.
CPC .............. *F02C 7/1435* (2013.01); *F02C 7/04* (2013.01); *F02C 7/05* (2013.01); *F02C 7/143* (2013.01); *F28C 1/16* (2013.01); *F28C 3/08* (2013.01); *F28F 3/025* (2013.01); *F28F 3/12* (2013.01); *F28F 21/065* (2013.01); *F05D 2250/61* (2013.01); *F05D 2260/207* (2013.01); *F05D 2300/43* (2013.01); *F28F 2245/02* (2013.01)

(58) Field of Classification Search
CPC .... F02C 3/30; F02C 7/12; F02C 7/143; F02C 7/1435; F02C 7/04; F02C 7/05; F04D 29/5826; F04D 29/5846
See application file for complete search history.

(56) References Cited

U.S. PATENT DOCUMENTS

| | | | |
|---|---|---|---|
| 8,662,150 B2 | 3/2014 | Kippel | |
| 10,260,421 B2 * | 4/2019 | Frese | ................. F04D 29/5846 |
| 2009/0294548 A1 * | 12/2009 | Geiger | ..................... B32B 5/26 |
| | | | 239/6 |
| 2010/0101234 A1 * | 4/2010 | Birkner | .................... C09D 1/00 |
| | | | 60/806 |
| 2010/0307164 A1 * | 12/2010 | Zhang | ................... F02C 7/1435 |
| | | | 60/794 |
| 2011/0042836 A1 * | 2/2011 | Zhang | ...................... F02C 7/04 |
| | | | 261/101 |
| 2012/0031596 A1 * | 2/2012 | Kippel | ..................... F28D 5/00 |
| | | | 165/168 |
| 2014/0123674 A1 | 5/2014 | Hao | |

(Continued)

*Primary Examiner* — Craig Kim
(74) *Attorney, Agent, or Firm* — Evershields Sutherland (US) LLP

(57) ABSTRACT

The present application provides a gas turbine engine. The gas turbine engine may include a compressor and an inlet air system positioned upstream of the compressor. The inlet air system may include a wetted media pad for evaporative cooling. The wetted media pad may include a contoured configuration.

11 Claims, 6 Drawing Sheets

(56) References Cited

U.S. PATENT DOCUMENTS

| | | |
|---|---|---|
| 2015/0121881 A1 | 5/2015 | Zhang |
| 2015/0315970 A1 | 11/2015 | John |
| 2015/0322865 A1 | 11/2015 | Scipio |
| 2015/0377569 A1* | 12/2015 | Zhang .................. F02C 7/04 165/185 |
| 2016/0053637 A1* | 2/2016 | Zhang ................ F01D 25/12 415/119 |
| 2016/0108816 A1* | 4/2016 | Zhang ............... C04B 35/565 165/185 |
| 2016/0146043 A1 | 5/2016 | Zhang |

* cited by examiner

CONTOURED EVAPORATIVE COOLING MEDIUM

TECHNICAL FIELD

The present application and the resultant patent relate generally to gas turbine engines and more particularly relate to an evaporative cooling medium for a gas turbine engine having a number of optimized contoured configurations for improved cooling efficiency.

BACKGROUND OF THE INVENTION

A conventional gas turbine engine includes a compressor for compressing a flow of ambient air, a combustor for mixing the compressed flow of ambient air with a flow of fuel to create a flow of hot combustion gases, and a turbine that is driven by the hot combustion gases to produce mechanical work. The turbine may drive a load such as a generator for electrical power. Various strategies are known for increasing the amount of power that a gas turbine engine may be able to produce. One method of increasing the power output is by cooling the incoming ambient air flow upstream of the compressor. Such cooling may cause the air flow to have a higher density, thereby creating a higher mass flow rate into the compressor. The higher mass flow rate into the compressor allows more air to be compressed so as to allow the gas turbine engine to produce more power. Moreover, cooling the ambient air flow generally may increase the overall efficiency of the gas turbine engine in hot environments.

Various systems and methods may be utilized to cool the ambient air flow entering the gas turbine engine. For example, inlet air systems with one or more heat exchangers may be used to cool the ambient air flow through latent cooling or through sensible cooling. Such heat exchangers often may utilize a wetted media pad to facilitate the cooling of the ambient air flow. These wetted media pads may allow heat and/or mass transfer between the ambient air flow and a coolant flow such as a flow of water. The ambient air flow interacts with the coolant flow in the wetted media pad for heat exchange therewith. The airflow passages through such wetted media pads are intended to provide effective water evaporation and mixing of the flow of ambient air with the water vapor from the flow of water. As the air velocity increases, however, water shedding may occur. Specifically, airborne water droplets may accumulate in a downstream inlet duct and/or flow into the compressor. Such water droplets may cause blade abrasion and other types of damage.

Conversely, various types of inlet air filtration systems may be used upstream of the compressor. The incoming air flow may contain fluid particles, such as water, that may affect the performance of the gas turbine engine or other type of power generation equipment. Such fluid particles may reduce the life expectancy and performance of the gas turbine engine and other types of power generation equipment. To avoid these problems, the inlet air may pass through a series of filters and screens to assist in removing the fluid particles from the airstream. A gas turbine engine may employ both the power augmentation systems and the inlet air filtration systems.

SUMMARY OF THE INVENTION

The present application and the resultant patent thus provide a gas turbine engine. The gas turbine engine may include a compressor and an inlet air system positioned upstream of the compressor. The inlet air system may include a wetted media pad for evaporative cooling. The wetted media pad may include a contoured configuration.

The present application and the resultant patent further provide a method of cooling an inlet air flow for a gas turbine engine. The method may include the steps of positioning a synthetic media pad about an inlet of the gas turbine engine, wherein the synthetic media pad includes a contoured configuration, flowing water from a top to a bottom of the synthetic media pad, flowing air through the contoured configuration, and exchanging heat between the inlet air flow and the flow of water.

The present application and the resultant patent further provide a gas turbine engine. The gas turbine engine may include a compressor and an inlet air system positioned upstream of the compressor. The inlet air system may include a wetted media pad for evaporative cooling. The wetted media pad may include a tapered configuration or a curved configuration.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
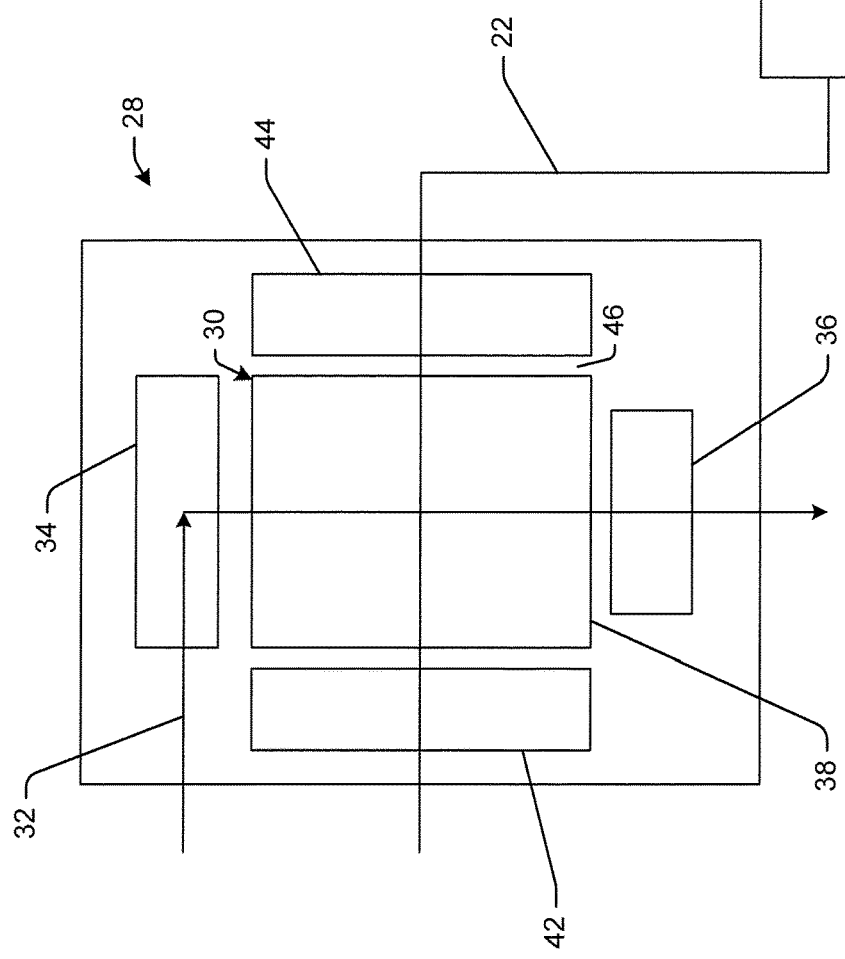
FIG. 1 is a schematic diagram of a gas turbine engine with a compressor, a combustor, a turbine, and a load.

Referring now to the drawings, in which like numerals refer to like elements throughout the several views, FIG. 1 is a schematic diagram of an example of a gas turbine engine 10. The gas turbine engine 10 may include a compressor 12, a combustor 14, and a turbine 16. Although only a single combustor 14 is shown, any number of the combustors 14 may be used herein and positioned in a circumferential array and the like. The compressor 12 and the turbine 16 may be coupled by a shaft 18. The shaft 18 may be a single shaft or a number of shaft segments coupled together. The shaft 18 also may drive a load such as a generator and the like.

The gas turbine engine 10 further may include a gas turbine air inlet 20. The air inlet 20 may be configured to accept an inlet air flow 22. For example, the air inlet 20 may be in the form of a gas turbine inlet house and the like. Alternatively, the air inlet 20 may be any portion of the gas turbine engine 10, such as any portion of the compressor 12 or any apparatus upstream of the compressor 12 which may accept the inlet air flow 22. The inlet air flow 22 may be ambient air and may be conditioned or unconditioned.

The gas turbine engine 10 further may include an exhaust outlet 24. The exhaust outlet 24 may be configured to discharge a gas turbine exhaust flow 26. The exhaust flow 26 may be directed to a heat recovery steam generator (not shown). Alternatively, the exhaust flow 26 may be, for example, directed to an absorption chiller (not shown) to chill a flow of water, directed to a waste heat recovery unit (not shown), directed to a desalination plant, or dispersed into the ambient air in whole or in part.

The gas turbine engine 10 further may include an inlet air system 28 with one or more heat exchangers 30. The inlet air system 28 may be configured to cool the inlet air flow 22 before entry into the compressor 12. For example, the inlet air system 28 may be disposed about the gas turbine air inlet 20. Alternatively, the inlet air system 28 may be upstream or downstream of the gas turbine inlet 20. The inlet air system 28 may allow the inlet air flow 22 and a heat exchange medium such as a flow of water 32 to exchange heat in the heat exchanger 30. The heat exchange medium also may be any suitable type of fluid flow. The heat exchanger 30 thus may facilitate the interaction of the inlet air flow 22 and the flow of water 32 therein so as to cool the inlet air flow 22 before entering the compressor 12.

The heat exchanger 30 may be a direct contact type heat exchanger 30. The heat exchanger 30 may include a heat exchange medium inlet 34, a heat exchange medium outlet 36, and a wetted media pad 38 therebetween. The flow of water 32 or other type of heat exchange medium may flow through the heat exchange medium inlet 34 to the wetted media pad 38. The heat exchange medium inlet 34 may include a nozzle, a number of nozzles, a manifold with an orifice or a number of orifices, and the like. The heat exchange medium outlet 36 may accept the flow of water 32 exhausted from the wetted media pad 38. The heat exchange medium outlet 36 may be a sump disposed downstream of the media pad 38 in the direction of the flow of water 32. The flow of water 32 may be directed in a generally or approximately downward direction from the heat exchange medium inlet 34 through the wetted media pad 38 while the inlet air flow 22 may be directed through the heat exchanger 30 in a direction generally or approximately perpendicular to the direction of the flow of water 32. Other types of counter or cross flow arrangements also may be used.

A filter 42 may be disposed upstream of the wetted media pad 38 in the direction of inlet air flow 22. The filter 42 may be configured to remove particulates from the inlet air flow 22 so as to prevent the particulates from entering into the gas turbine engine 10. Alternatively, the filter 42 may be disposed downstream of the wetted media pad 38 in the direction of inlet air flow 22. A drift eliminator 44 may be disposed downstream of the wetted media pad 38 in the direction of inlet air flow 22. The drift eliminator 44 may act to remove droplets of the flow of water 32 from the inlet air flow 22 before the inlet air flow 22 enters the compressor 12. As described above, the drift eliminator 44 may include a number of thermoplastic components positioned at an angle downstream of the media pad 38 and the like. The angle changes the direction of the airstream to separate the water droplets therein. The wetted media pad 38 and the drift eliminator 44 may be separated by a gap 46. The length of the gap 46 may vary.

The heat exchanger 30 may be configured to cool the inlet air flow 22 through latent or evaporative cooling. Latent cooling refers to a method of cooling where heat is removed from a gas, such as air, so as to change the moisture content of the gas. Latent cooling may involve the evaporation of a liquid at approximate ambient wet bulb temperature to cool the gas. Specifically, latent cooling may be utilized to cool a gas to near its wet bulb temperature. Alternatively, the heat exchanger 30 may be configured to chill the inlet air flow 22 through sensible cooling. Sensible cooling refers to a method of cooling where heat is removed from a gas, such as air, so as to change the dry bulb and wet bulb temperatures of the air. Sensible cooling may involve chilling a liquid and then using the chilled liquid to cool the gas. Specifically, sensible cooling may be utilized to cool a gas to below its wet bulb temperature. It should be understood that latent cooling and sensible cooling are not mutually exclusive cooling methods. Rather, these methods may be applied either exclusively or in combination. It should further be understood that the heat exchanger 30 described herein is not limited to latent cooling and sensible cooling methods, but may cool, or heat, the inlet air flow 22 through any suitable cooling or heating method as may be desired.

Figure 2:
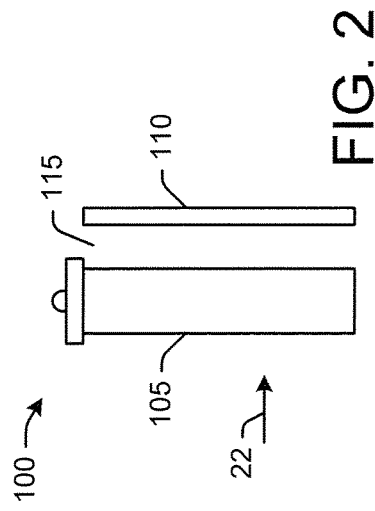
FIG. 2 is a schematic diagram of an inlet air system that may be used with the gas turbine engine of FIG. 1.

FIG. 2 show an example of an inlet air system 100 as may be described herein. In this example, the inlet air system 100 may include a wetted media pad 105 and a downstream drift eliminator 110. The wetted media pad 105 and the drift eliminator 110 may be separated by a gap 115. The length of the gap 115 may vary. The wetted media pad 105 and/or the drift eliminator 110 may be made out of a synthetic media pad 120 in whole or in part. The wetted media pad 105 and the drift eliminator 110 may have any suitable size, shape, or configuration. Other components and other configurations may be used herein.

Figure 3:
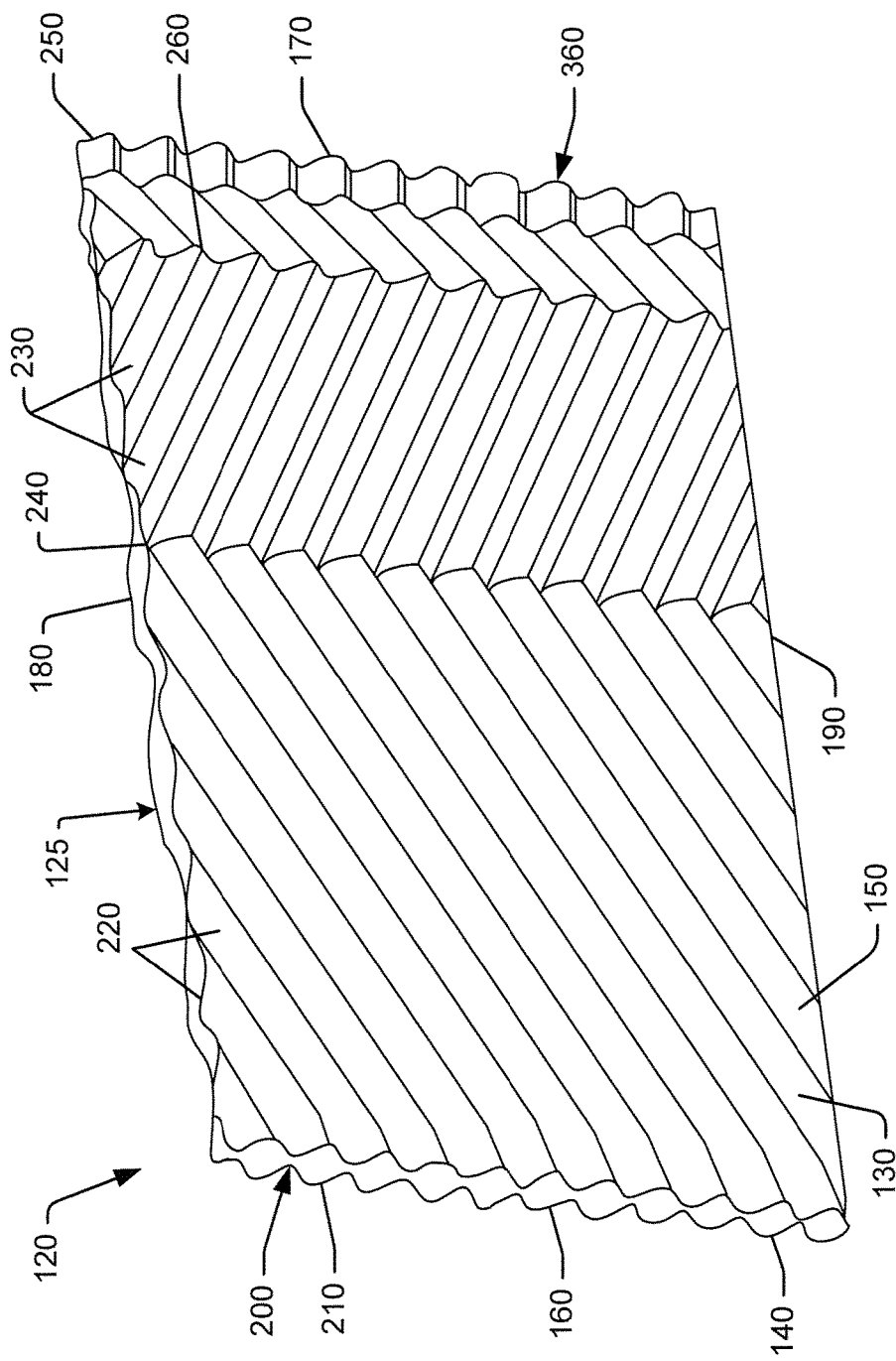
FIG. 3 is a perspective view of a first side of a synthetic media pad as may be described herein.
Figure 4:
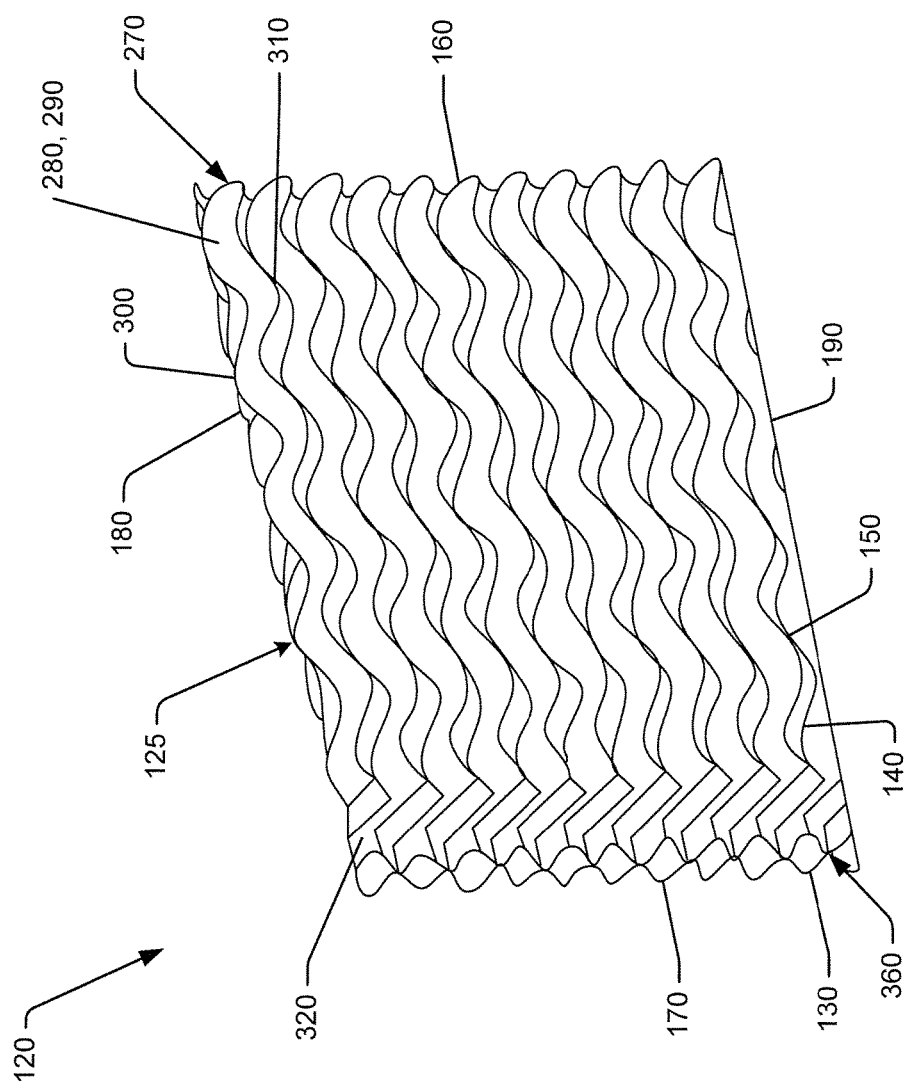
FIG. 4 is a perspective view of a second side of the synthetic media pad of FIG. 3.
Figure 5:
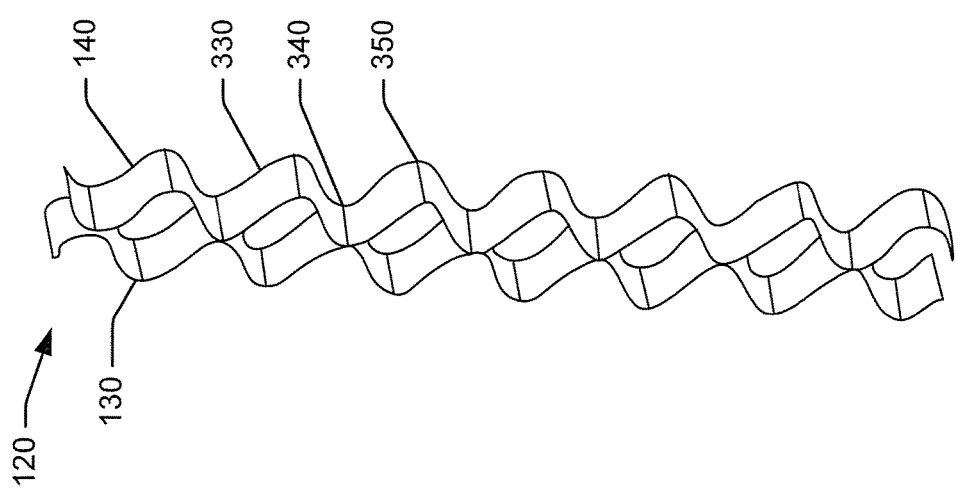
FIG. 5 is a side view of the synthetic media pad of FIG. 3.

As is shown in FIGS. 3-5, the synthetic media pad 120 may include at least a pair of media sheets 125 therein. In this example, a first media sheet 130 and a second media sheet 140 are shown although additional sheets may be used herein. Any number of the media sheets 125 may be used herein in any suitable size, shape, or configuration. The media sheets 125 may be thermally formed from non-woven synthetic fibers with or without hydrophilic surface enhancements. For example, the non-woven synthetic fibers may include polyethylene terephthalate (PET), polytrimethylene terephthalate (PTT), nylon, polyester, polypropylene, and the like. The hydrophilic surface enhancements may include the application of a strong alkaline treatment under high processing temperatures, polyvinyl alcohol in an alkaline medium, and the like. Other materials and treatments may be used herein. The media sheets 125 may be wettable so as to accept, absorb, flow, and distribute the flow of water 32 or other type of heat exchange medium through the surface area thereof. The media sheets 125 may be utilized with different types of heat exchange mediums.

Generally described, the media sheets 125 may have a substantially three dimensional contoured shape 150. Specifically, the media sheets 125 may include a leading edge 160 facing the incoming inlet air flow 22 and a downstream trailing edge 170 facing about the compressor 12. Likewise, the media sheets 125 may have a top edge 180 for receiving the flow of water 32 and a downstream bottom edge 190 positioned about a drain and the like.

In this example, the first media sheet 130 may have a chevron like corrugated surface 200. The chevron like corrugated surface 200 may have a number of chevron channels 210 therein. Any number of the chevron channels 210 may be used herein in any suitable size, shape, or configuration. Specifically, the chevron channels 210 may have a diagonally rising portion 220 and a diagonally lowering portion 230. The diagonally rising portion 220 may extend from the leading edge 160 and meet the diagonally lowering portion 230 about an apex 240 thereof. The angle of the rising and the lowering portions may vary. Optionally, each of the chevron channels 210 may end in a first side mist eliminator portion 250. The first side mist eliminator portions 250 may extend diagonally upward in a sharp angle at a nadir 260 of each of the diagonally lowering portions 230. The first side mist eliminator portions 250 may extend from the nadir 260 towards the trailing edge 170. Other components and other configurations may be used herein.

The second media sheet 140 may have a wavy corrugated surface 270. Specifically, the wavy corrugated surface 270 may have a number of wavy channels 280. Any number of the wavy channels 280 may be used herein in any size, shape, or configuration. Specifically, the wavy channels 280 may have a substantially sinusoidal like shape 290 with a number of peaks 300 and valleys 310. Optionally, the wavy channels 280 may extend from the leading edge 160 to a second side mist eliminator portion 320. The second side mist eliminator portions 320 may extend diagonally upward in a sharp angle from one of the valleys 310 of the sinusoidal like shape 290. The second side mist eliminator portions 320 may extend from the valley 310 towards the trailing edge 170. Other components and other configurations may be used herein.

FIG. 5 shows a first media sheet 130 bound to a second media sheet 140. The leading edge 160 thus forms a diamond like shape 330. The diamond like shape 330 may include a bonding portion 340 where the media sheets 130, 140 may meet and may be bonded via glue and the like and an expanded portion 350 for good airflow therethrough. The trailing edge 170 likewise may include the diamond like shape 330 for good air flow therethrough. Optionally, the first side mist eliminator portion 250 and the second side mist eliminator portion 320 may combine to form an integrated mist eliminator 360 of a substantially uniform shape about the trailing edge 170. Other components and other configurations may be used herein.

In use, the flow of water 32 may flow from the top edge 180 to the bottom edge 190 of the media sheets 125 in the synthetic media pad 120. The media sheets 125 may be fully wetted by the flow of water 32 therethrough. The inlet air flow 22 enters via the leading edge 160 and comes in contact with the flow of water 32 for heat exchange therewith. Due to the twisting and swirling airflow generated between the media sheets 125, the flow of water 32 may evaporate into the inlet air flow 22 so as to reduce the temperature of the flow of water 32 to about the inlet air wet bulb temperature. Specifically, the twisting and swirling airflows increase heat and mass transfer therethrough.

The use of the chevron like corrugated surface 200 on the first media sheet 130 helps to distribute the flow of water 32 towards the leading edge 160. The wavy corrugated surface 270 of the second media sheet 140 provides stiffness and spreads the flow of water 32 more evenly over the media depth. The optional integrated mist eliminator 360 extends upward at a sharp angle to the airflow therethrough. This angle relies on inertial forces on any water droplets therein at the sharp turn. The water droplets thus may drain downward under the force of gravity and remain within the media sheets 125. The use of the diamond like shape 330 at the leading edge 160 and the trailing edge 170 also serves to reduce air pressure losses therethrough. The wetted media pad 105 described herein thus may increase overall air mass flow in hot weather so as to avoid or limit overall gas turbine output reduction and performance deterioration in a simplified system.

Figure 6:
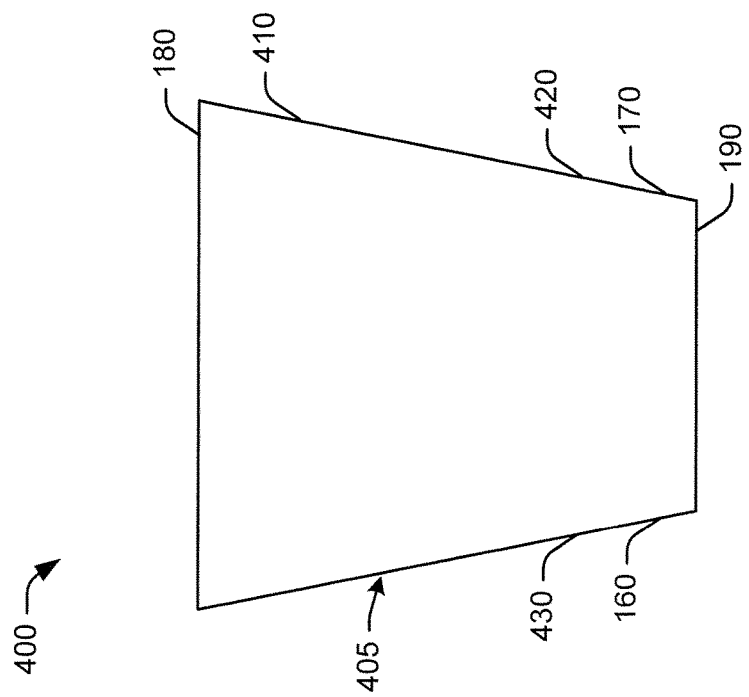
FIG. 6 is a perspective view of a contoured synthetic media pad as may be described herein.

FIG. 6 shows a further embodiment a synthetic media pad 400 as may be described herein. Conventional media pads generally were configured as a rectangular block. Temperature gradients, however, may develop as the water passes from the top edge 180 about an upper section 410 to a lower section 420 about the bottom edge 190 as well as when the air passes from the leading edge 160 to the trailing edge 170. In order to maximize overall cooling efficiency and to reduce such gradients, the synthetic media pad 400 may have a contoured configuration 405. Many different types and combinations of contours may be used. In this example, the synthetic media pad 400 may have a substantially tapered configuration 430. Specifically, the synthetic media pad 400 may reduce in width from the top edge 180 to the bottom edge 190. The extent of the reduction may vary. Although both the leading edge 160 and the trailing edge 170 are shown with the tapered configuration 410, either edge may have a straight orientation and/or either edge may have a varying angle of taper. The tapered configuration 405 channels more of the water flow into the reduced width of the lower section 420 about the bottom edge 190. Given such, the lower section 420 has a smaller cross-section for the passage of air as compared to the upper section 410 for increased cooling efficiency. Other components and other configurations may be used herein.

Figure 8:
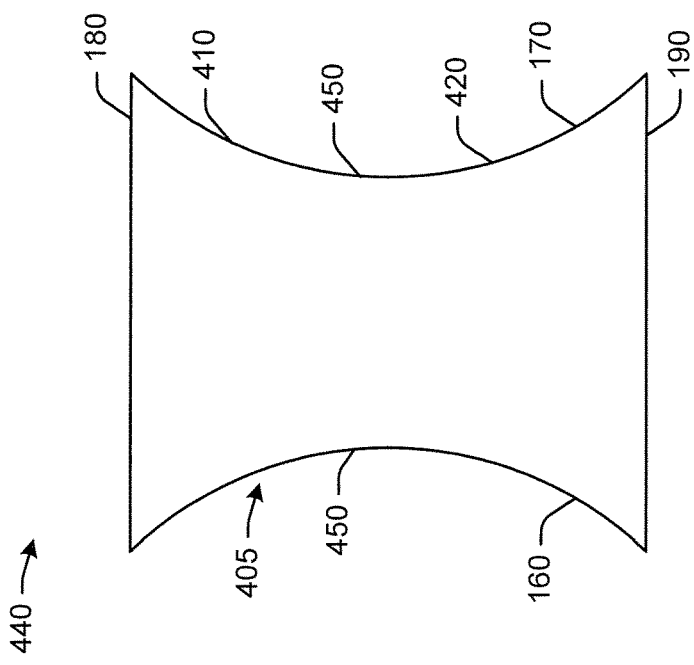
FIG. 8 is a perspective view of an alternative embodiment of a contoured synthetic media pad as may be described herein.
Figure 7:
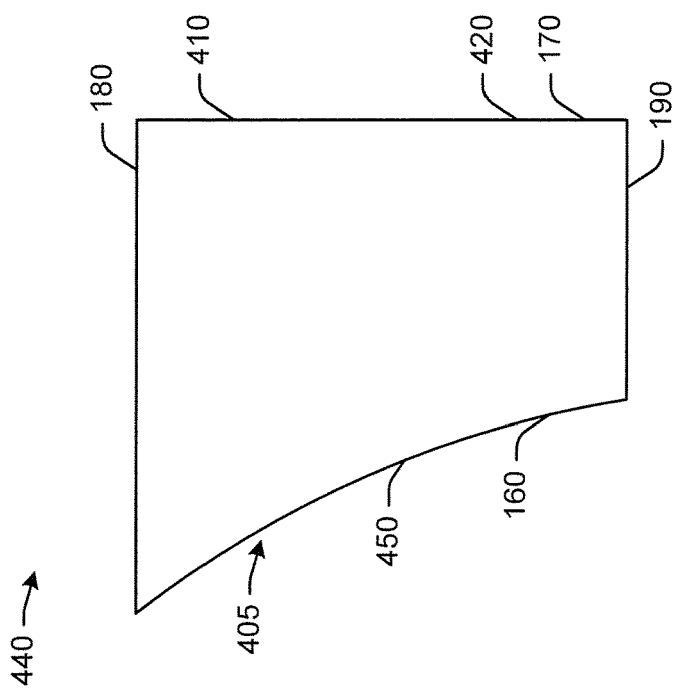
FIG. 7 is a perspective view of an alternative embodiment of a contoured synthetic media pad as may be described herein.

FIGS. 7 and 8 show further embodiments of a synthetic media pad 440 as may be described herein. In this example, either or both the leading edge 160 and the trailing edge 170 may have a substantially curved configuration 450. Specifically, FIG. 7 shows the leading edge 160 having the curved configuration 450 and the trailing edge 170 have a straight configuration (the orientations may be reversed) while FIG. 8 shows both the leading edge 160 and the trailing edge 170 having the curved configuration 450. The nature of the curved configuration 450 may vary. The curved configuration 450 serves to reduce and/or vary the cross-section for the passage of air therethrough. Other components and other configurations may be used herein.

The synthetic media pads described herein thus have an optimized configuration for improved evaporative cooling efficiency. In addition to reducing the cross-section for the passage of air, the configuration of the leading edge 160 also may be optimized for the expected velocity profile of the incoming air flow. Other parameters also may be optimized herein. The optimized configurations also generally require less of the synthetic media material so as to promote an overall cost savings.

Figure 10:
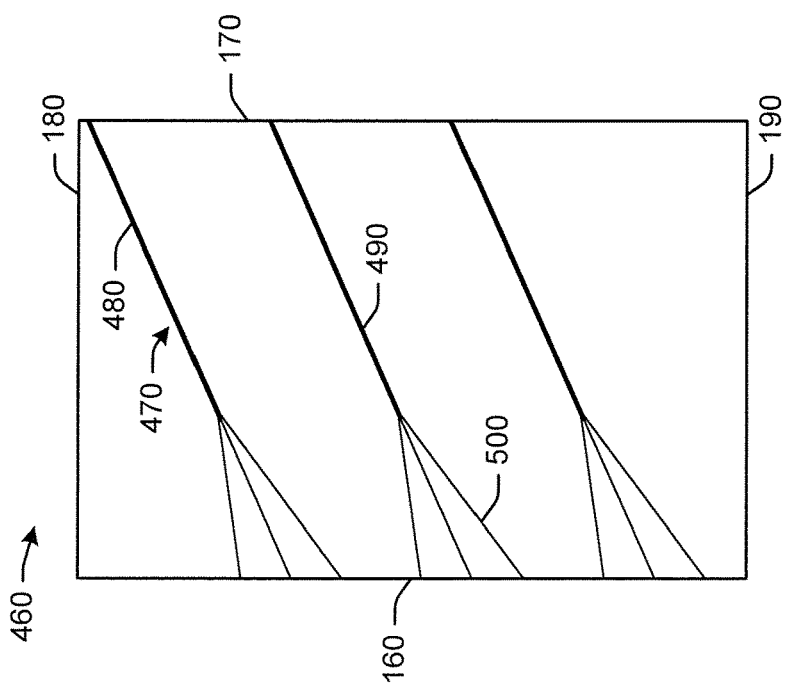
FIG. 10 is a schematic view of an alternative embodiment of a pathway within a synthetic media pad as may be described herein.
Figure 9:
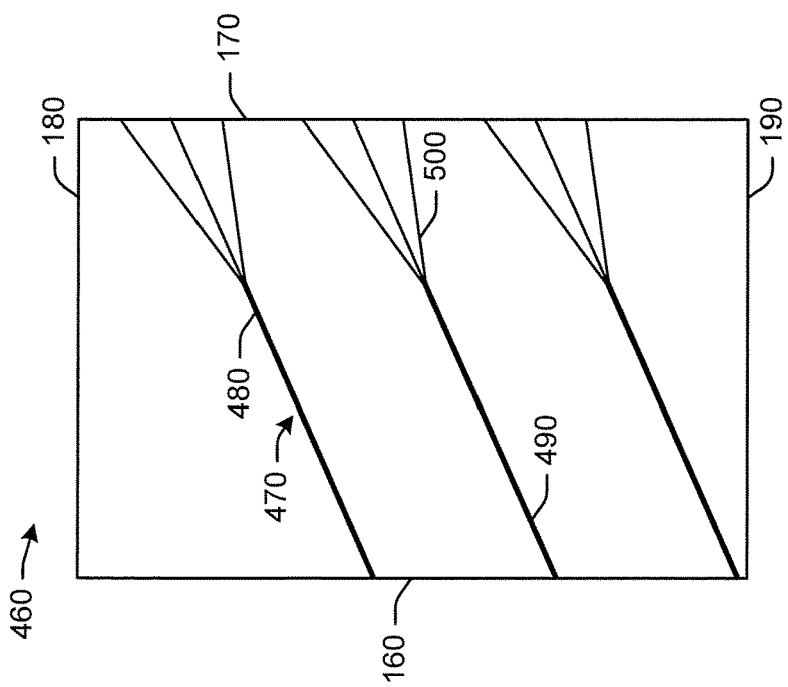
FIG. 9 is a schematic view of a pathway within a synthetic media pad as may be described herein.

FIGS. 9 and 10 show a further embodiment of a synthetic media pad 460 as may be described herein. In addition to changing the overall size, shape, and configuration of the media pad, the size, shape, and configuration of the air and/or the water channels may be varied. Current air and water channels tend to be of a uniform configuration. Specifically, air and water distribution across the media pads relies on opposing channels through the media. The air and water distribution is not always uniform such that in some areas the air/water ratio may be too high or too low and result in either water carryover or random dry spots in the media.

FIGS. 9 and 10 show the synthetic media pad 460 with a number of channels 470 therein. The channels 470 may be for air or water. The channels 470 may have a branched configuration 480. Specifically, FIG. 9 shows a number of larger, single channels 490 each branching into a number of smaller, multiple channels 500. The larger, single channels 490 may branch into the smaller, multiple channels 500 in the general direction of the leading edge 160 to the trailing edge 170 and/or from the top edge 180 to the bottom edge 190. FIG. 10 shows the opposite configuration with the smaller, multiple channels 500 merging into the larger, single channel 490. The smaller, multiple channels 500 may merge into the larger, single channel 490 in the general direction of the leading edge 160 to the trailing edge 170 and/or from the top edge 180 to the bottom edge 190. Any number of the channels 470 may be used herein in any suitable size, shape, configuration, or direction. Other components and other configurations may be used herein.

The use of the channels 470 with the branched configuration 480 thus may optimize water distribution and/or air distribution through the synthetic media pad 460 and/or may optimize overall heat/mass transfer therethrough. Any or all of these benefits may improve evaporative efficiency with the same or a reduced footprint. Specifically, the channels 470 may provide for more uniform heat/mass transfer by biasing the air flow to where it is in best contact with the water flow. Better water to air distribution results in more efficient cooling. The channels 470 also may serve to reduce the pressure drop therethrough for further efficiency improvements.

In addition to the synthetic media pad 120, the wetted media pad 105 also could be made out of cellulose. Examples of a media pad 105 made out of cellulose include the CELdek pads made by Munters of Kista Sweden. Such a media pad may have alternating diagonal flutes. Other types of media pads may be used herein.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A gas turbine engine, comprising:
a compressor; and
an inlet air system positioned upstream of the compressor;
the inlet air system comprising a wetted media pad for evaporative cooling;
wherein the wetted media pad comprises a contoured configuration;
wherein the contoured configuration comprises a curved configuration extending from an upper section to a lower section along at least one of a leading edge and a trailing edge.

2. The gas turbine engine of claim 1, wherein the wetted media pad comprises polyethylene terephthalate (PET), polytrimethylene terephthalate (PTT), nylon, polyester, polypropylene, or cellulose.

3. A gas turbine engine of claim 1, comprising:
a compressor; and
an inlet air system positioned upstream of the compressor;
the inlet air system comprising a wetted media pad for evaporative cooling;
wherein the wetted media pad comprises a plurality of channels therethrough with a branched configuration;
wherein the branched configuration comprises at least one of a larger, single channel branching into smaller, multiple channels and smaller, multiple channels merging into a larger, single channel.

4. The gas turbine engine of claim 3, wherein the plurality of channels with the branched configuration extend from a leading edge to a trailing edge or from a top edge to a bottom edge.

5. The gas turbine engine of claim 1, wherein the wetted media pad comprises:
a first media sheet;
the first media sheet comprising a chevron corrugated surface; and
a second media sheet;
the second media sheet comprising a wavy corrugated surface.

6. The gas turbine engine of claim 5, wherein the chevron corrugated surface and the wavy corrugated surface extend from a leading edge towards a trailing edge and wherein the leading edge and the trailing edge comprise a diamond like shape.

7. The gas turbine engine of claim 6, wherein the diamond like shape comprises a bonding portion and an expanded portion.

8. The gas turbine engine of claim 5, wherein the chevron corrugated surface comprises a plurality of chevron channels with diagonally rising portions and diagonally lowering portions.

9. The gas turbine engine of claim 5, wherein the wavy corrugated surface comprises a plurality of wavy channels with peaks and valleys.

10. A gas turbine engine, comprising:
a compressor; and
an inlet air system positioned upstream of the compressor;
the inlet air system comprising a wetted media pad for evaporative cooling;
wherein the wetted media pad comprises curved configuration;
wherein the curved configuration extends from an upper section to a lower section along at least one of a leading edge and a trailing edge.

11. The gas turbine engine of claim 10, wherein the wetted media pad comprise polyethylene terephthalate (PET), polytrimethylene terephthalate (PTT), nylon, polyester, polypropylene, or cellulose.

* * * * *